(12) United States Patent  
Chuang et al.

(10) Patent No.: US 9,223,447 B2
(45) Date of Patent: Dec. 29, 2015

(54) TOUCH PANEL, TOUCH DISPLAY DEVICE AND ASSEMBLING METHOD THEREOF

(75) Inventors: Wen-Chi Chuang, New Taipei (TW); Chia-Chun Yeh, Taipei (TW); Pei-Jung Wu, Taipei (TW); Cheng-Ta Ho, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 387 days.

(21) Appl. No.: 13/471,457

(22) Filed: May 15, 2012

(65) Prior Publication Data

US 2013/0222345 A1     Aug. 29, 2013

(30) Foreign Application Priority Data

Feb. 29, 2012   (TW) ............................... 101106563 A

(51) Int. Cl.
*G06F 3/042* (2006.01)
*G06F 3/044* (2006.01)

(52) U.S. Cl.
CPC ...... *G06F 3/044* (2013.01); *G06F 2203/04107* (2013.01)

(58) Field of Classification Search
CPC .................... G06F 2203/04107; G06F 3/044
USPC .............. 345/173–174, 175–176; 362/602
See application file for complete search history.

(56) References Cited

U.S. PATENT DOCUMENTS

| | | | |
|---|---|---|---|
| 7,715,102 B2 | 5/2010 | Nakanishi | |
| 2004/0080267 A1* | 4/2004 | Cok | G06F 3/0412 313/512 |
| 2004/0201579 A1* | 10/2004 | Graham | 345/175 |
| 2007/0171493 A1* | 7/2007 | Nakanishi | 359/15 |
| 2008/0198144 A1* | 8/2008 | Shimizu et al. | 345/175 |
| 2008/0252620 A1* | 10/2008 | Shimizu | 345/176 |
| 2009/0102808 A1* | 4/2009 | Huang | G06F 3/044 345/173 |
| 2009/0153783 A1* | 6/2009 | Umemoto | G02B 27/28 349/96 |
| 2010/0007633 A1* | 1/2010 | Juni | 345/175 |

(Continued)

FOREIGN PATENT DOCUMENTS

| | | |
|---|---|---|
| CN | 1922539 | 2/2007 |
| CN | 101512415 | 8/2009 |

(Continued)

OTHER PUBLICATIONS

"Office Action of Taiwan Counterpart Application", issued on Jan. 14, 2014, p. 1-p. 7.

*Primary Examiner* — Quan-Zhen Wang
*Assistant Examiner* — Tony Davis
(74) *Attorney, Agent, or Firm* — Jianq Chyun IP Office

(57) ABSTRACT

A touch panel including a substrate, a light shielding layer, a touch sensing device layer, a protective layer, and at least one light transmission protrusion is provided. The substrate has a first surface and a second surface opposite to the first surface, wherein the first surface is divided into a visual region and a non-visual region. The light shielding layer is disposed in the non-visual region. The touch sensing device layer is disposed on the first surface of the substrate. The protective layer disposed on the first surface of the substrate covers the light shielding layer and the touch sensing device layer. The light transmission protrusion is disposed on the protective layer, and at least part of the light transmission protrusion is in the non-visual region. A light enters the light transmission protrusion from the second surface. A touch display device and an assembling method thereof are also provided.

14 Claims, 2 Drawing Sheets

(56) References Cited

U.S. PATENT DOCUMENTS

| | | | |
|---|---|---|---|
| 2010/0182686 A1 | 7/2010 | Fukushima et al. | |
| 2010/0199818 A1* | 8/2010 | Lee | B26D 1/547 83/16 |
| 2010/0245706 A1* | 9/2010 | Oohira | 349/58 |
| 2010/0265195 A1* | 10/2010 | Watanabe | C09J 7/00 345/173 |
| 2011/0050626 A1* | 3/2011 | Porter et al. | 345/174 |
| 2011/0134070 A1* | 6/2011 | Wang et al. | 345/174 |
| 2011/0177261 A1* | 7/2011 | Ishii | G02F 1/133308 428/1.5 |
| 2011/0285759 A1* | 11/2011 | Sakai | G09G 3/3648 345/690 |
| 2012/0026102 A1* | 2/2012 | Chang | G02F 1/1338 345/173 |
| 2012/0120080 A1* | 5/2012 | Wang | G02B 6/0015 345/520 |
| 2012/0299872 A1* | 11/2012 | Nishikawa | G06F 3/045 345/174 |
| 2012/0306791 A1* | 12/2012 | Lee | G06F 3/041 345/173 |
| 2013/0105289 A1* | 5/2013 | Lee et al. | 200/304 |
| 2013/0106727 A1* | 5/2013 | Juan et al. | 345/173 |
| 2013/0215638 A1* | 8/2013 | Dabov | G02B 6/001 362/602 |

FOREIGN PATENT DOCUMENTS

| | | |
|---|---|---|
| CN | 102221928 | 10/2011 |
| JP | 2003315787 | 11/2003 |
| TW | 594258 | 6/2004 |
| TW | I280426 | 5/2007 |
| TW | M408078 | 7/2011 |

* cited by examiner

TOUCH PANEL, TOUCH DISPLAY DEVICE AND ASSEMBLING METHOD THEREOF

CROSS-REFERENCE TO RELATED APPLICATION

This application claims the priority benefit of Taiwan application serial no. 101106563, filed on Feb. 29, 2012. The entirety of the above-mentioned patent application is hereby incorporated by reference herein and made a part of this specification.

BACKGROUND OF THE INVENTION

1. Field of the Invention

The present invention relates to a touch panel, and more particularly, to a touch display device using the touch panel and an assembling method thereof.

2. Description of Related Art

Currently, glass substrate based touch panels utilizes two-glass structures, i.e., the structure is fabricated by putting a touch glass and a cover glass together. In order to meet current demands on lightness, slimness and compactness of portable devices, the out-cell touch sensing technique is gradually moving towards a one-glass solution (OGS) so as to reduce sticking or adhesive costs and improve touch sensitivity. OGS is related to combining a touch sensor layer and a cover glass together in order to make the touch panel structure simplified into one-glass structure. Namely, a conductive layer including X axis sensing electrodes and Y axis sensing electrodes are plated onto the inner surface of the cover glass, so that costs of glass material, attaching or adhesive costs and some manufacturing process can be reduced to increase the manufacturing yield. In addition, transmittance and touch sensitivity of the panel can be greatly enhanced since the panel has dispensed with the sensor impedance of a glass due to slimness and lightness.

Regarding the touch display device fabricated with the aforementioned OGS, filling light curable adhesive between the display panel and the touch panel and after that providing a curable light from a side near the touch panel is commonly used in the integrating process of the touch panel and the display panel for illuminating and curing the light curable adhesive. However, the light shielding layer located in the non-visual region shields a portion of light curable adhesive located behind thereof, and thus the light curable adhesive located there cannot be completely cured and it may lead the light curable adhesive to leak into the visual region and further affects the image of touch display device.

SUMMARY OF THE INVENTION

The invention provides a touch panel having a light transmission protrusion which facilitates a light launched into.

The present invention provides a touch display panel, and the touch panel thereof has a light transmission protrusion which facilitates the agglutination of the touch panel and the display panel.

The present invention provides a touch display device and an assembling method thereof having a superior light curing efficiency.

According to one embodiment of the present invention, a touch panel including a substrate, a light shielding layer, a touch sensing device layer, a protective layer and at least one light transmission protrusion is provided. The substrate has a first surface and a second surface opposite to the first surface, wherein the first surface includes a visual region and a non-visual region. The light shielding layer is disposed in the non-visual region of the substrate. The touch sensing device layer is disposed on the first surface of the substrate. The protective layer is disposed on the first surface of the substrate and covers the light shielding layer and the touch sensing device layer. The light transmission protrusion is disposed on the protective layer, wherein at least a part of the light transmission protrusion is located in the non-visual region, and a light enters the light transmission protrusion from the second surface.

The present invention provides a touch display device including a display panel, a touch panel and a light curable adhesive. The display panel and the touch panel are oppositely disposed to each other. The light curable adhesive is disposed between the touch panel and the display panel. The touch panel includes a substrate, a light shielding layer, a touch sensing device layer, a protective layer and at least one light transmission protrusion. The substrate has a first surface and a second surface opposite to the first surface, wherein the first surface includes a visual region and a non-visual region. The light shielding layer is disposed in the non-visual region of the substrate. The touch sensing device layer is disposed on the first surface of the substrate. The protective layer is disposed on the first surface of the substrate and covers the light shielding layer and the touch sensing device layer. The light transmission protrusion is disposed on the protective layer, wherein at least a part of the light transmission protrusion is located in the non-visual region, and a light enters the light transmission protrusion from the second surface.

According to one embodiment of the present invention, an assembling method of a touch display device includes disposing a touch panel on a display panel, and filling a light curable adhesive between the touch panel and the display panel, wherein the touch panel includes a substrate, a light shielding layer, a touch sensing device layer, a protective layer and at least one light transmission protrusion. The substrate has a first surface and a second surface opposite to the first surface, wherein the first surface includes a visual region and a non-visual region, and the second surface is departed from the display panel. The light shielding layer is disposed in the non-visual region of the substrate. The touch sensing device layer is disposed on the first surface of the substrate. The protective layer is disposed on the first surface of the substrate and covers the light shielding layer and the touch sensing device layer. The light transmission protrusion is disposed on the protective layer, wherein at least a part of the light transmission protrusion is located in the non-visual region. Then, a light is provided from the second surface, passes through the touch panel, illuminates and cures the light curable adhesive. A portion of the light illuminates and cures a portion of light curable adhesive located in the non-visual region after refracted by the light transmission protrusion.

According to one embodiment of the present invention, the cross-section of the light transmission protrusion is a shape with an arc edge or a polygonal shape.

According to one embodiment of the present invention, a light curable adhesive is used in bonding the touch panel to a display panel.

According to one embodiment of the present invention, the refractive index of the light curable adhesive is smaller than the refractive index of the light transmission protrusion.

According to one embodiment of the present invention, the refractive index of the light transmission protrusion is 1.6.

According to one embodiment of the present invention, the light transmission protrusion is fabricated by a photoresist coating process, an exposure process and a developing process.

According to an embodiment of the present invention, the light transmission protrusion is formed on an optical film and disposed on the protective layer.

According to an embodiment of the present invention, the assembling method further includes providing another light from a side of the touch panel and the display panel for illuminating and curing the light curable adhesive.

In light of the above, in the embodiment of the present invention, a light can enter the light transmission protrusion and then is refracted to the light curable adhesive located between the touch panel and the display panel through the light transmission protrusion disposed on the protective layer of the touch panel. Thus, a portion of the light curable adhesive located in the non-visual region can be completely cured.

In order to make the aforementioned features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
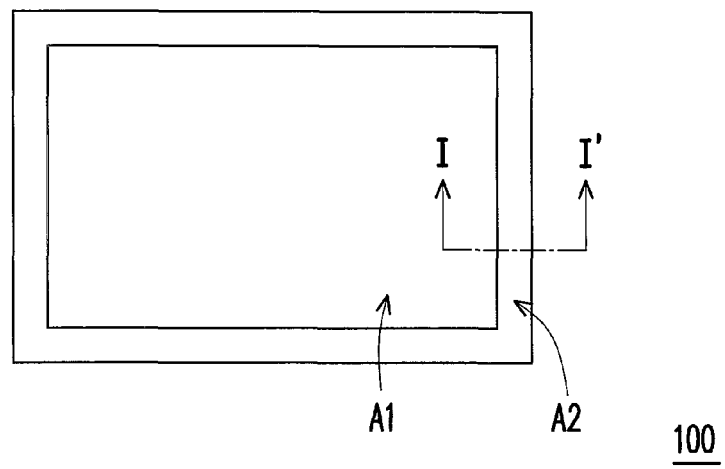
FIG. 1 is a schematic top view illustrating a touch display device according to an embodiment of the present invention.
Figure 2:
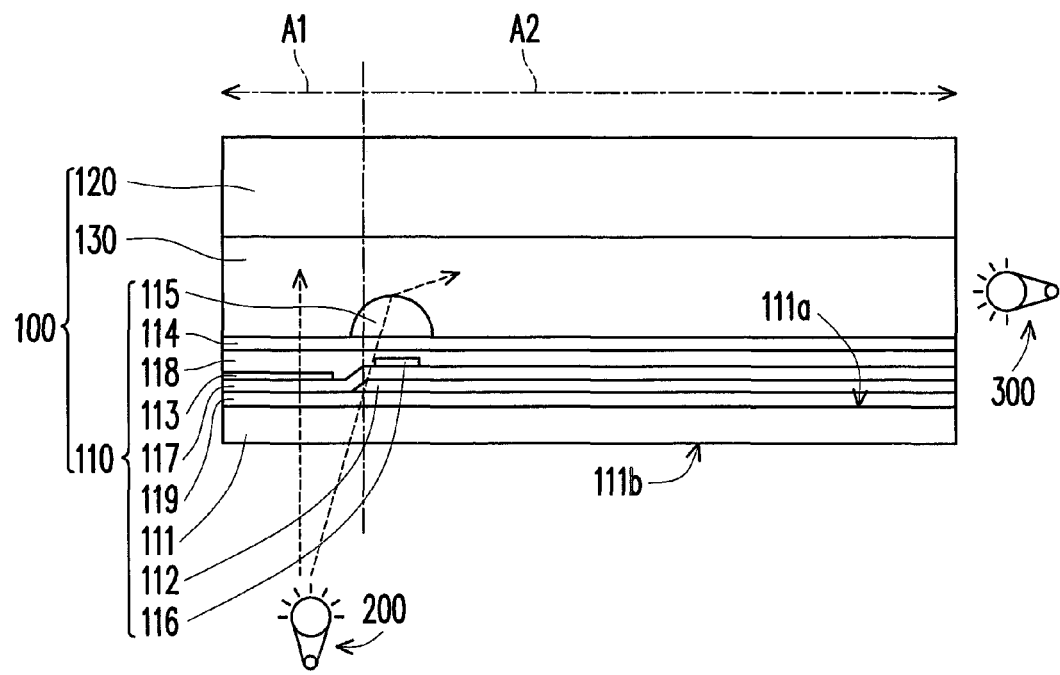
FIG. 2 is a schematic cross-sectional view of the touch display device taken along a sectional line I-I' depicted in FIG. 1.

FIG. 1 is a schematic top view illustrating a touch display device according to an embodiment of the present invention. FIG. 2 is a schematic cross-sectional view of the touch display device taken along a sectional line I-I' depicted in FIG. 1. Referring to FIG. 1 and FIG. 2 together, in the embodiment, the touch display device 100 includes a touch panel 110, a display panel 120 and a light curable adhesive 130 coated between the touch panel 110 and the display panel 120. A curing light source 200 is used to illuminate and cure the light curable adhesive 130 so as to achieve a touch sensing function by bonding the touch panel 110 to the display panel 120. In other words, the touch display device 100 of the embodiment can be fabricated by attaching the touch panel 110 to the display panel 120 by an out-cell attaching method, in order to simplify the assembling components of the touch display device 100 to achieve a product with the effects of slimness and lightness. Herein the display panel 110 can be a liquid crystal display panel, an organic electro-luminescent display panel, an electro-phoretic display panel, a field emission display panel, a plasma display panel or the like, and the present invention is not limited thereto.

More specifically, the touch panel 110 includes a substrate 111, a light shielding layer 112, a touch sensing device layer 113, a protective layer 114 and at least one light transmission protrusion 115. The substrate 111 has a first surface 111a and a second surface 111b opposite to the first surface 111a, wherein the first surface 111a includes a visual region A1 and a non-visual region A2 surrounding the visual region A1. The display panel 120 faces the first surface 111a, and the second surface 111b is departed from the display panel 120. Namely, the first surface 111a of the substrate 111 and the display panel 120 are attached together by using the light curable adhesive 130, so that the light shielding layer 112, the touch sensing device layer 113, the protective layer 114 and the light transmission protrusion 115 can be located between the substrate 111 and the display panel 120.

The touch sensing device layer 113 is, for example, a capacitive touch sensing component, disposed on the first surface 111a of the substrate 111 and located in the visual region A1. The material of the touch sensing device layer 113 includes a transparent conductive material, such as indium tin oxide (ITO), cadmium tin oxide (CTO), aluminum zinc oxide (AZO), indium zinc oxide (IZO), zinc oxide (ZnO), tin oxide (SnO), or a combination thereof. The light shielding layer 112 is disposed on the first surface 111a of the substrate 111 and located in the non-visual region A2. The material of the light shielding material 112 is an insulating material which is non-transparent such as resin, and the resin may be black resin or white resin. Accordingly, the non-visual region A2 may become a non-transparent region related to the visual region A1. In addition, the protective layer 114 is disposed on the first surface 111a of the substrate 111 and covers the light shielding layer 112 and the touch sensing device layer 113, so as to act like an insulating structure between the two layers 112, 113 and the light curable adhesive 130.

In the embodiment, since the light provided by the curing light source 200 is launched from the second surface 111b of the substrate 111 and enters the touch panel 110 for curing the light curable adhesive 130 located between the touch panel 110 and the display panel 120, a portion of the light curable adhesive 130 located above the light shielding layer 112 (in terms of the position shown in FIG. 2) is generally shielded by the light shielding layer 112 and hard to be completely cured. Accordingly, the light transmission protrusion 115 can be disposed on the protective layer 114, and at least a part of the light transmission protrusion 115 is located in the non-visual region A2. Therefore, a portion of light provided by the curing light source 200 may be launched into the aforementioned portion of the light curable adhesive 130 (represented by light L1 in FIG. 2) after refracted by the light transmission protrusion 115, and a portion of the light curable adhesive 130 located in the non-visual region A2 can be completely cured.

In view of the above, through the light transmission protrusion 115 disposed on the protective layer 114 with a part of it being located in the non-visual region A2, the light L1 launched into the light transmission protrusion 115 can be refracted and illuminate the light curable adhesive 130 located in the non-visual region A2. And thus the light curable adhesive 130 between the touch panel 110 and the display panel 120 can be completely cured, so as to improve the assembling yield of the touch display device 100.

In detailed, referring to FIG. 2 again, in the embodiment, the touch panel 110 further includes a metal trace layer 116, an insulating layer 117, a planar layer 118 and a buffer layer 119. The metal trace layer 116 is disposed on the light shielding layer 112 and electrically connected to the touch sensing device layer 113, so as to act as a peripheral circuit of the touch penal 110. The insulating layer 117 is disposed on the first surface 111a of the substrate 111 and covers the light shielding layer 112. Herein the insulating layer 117 crosses over the visual region A1 and the non-visual region A2, and the touch sensing device layer 113 and the metal trace layer 116 are located on the insulating layer 117 of the visual region A1 and the insulating layer 117 of the non-visual region A2, respectively.

In the embodiment, since the metal trace layer 116 and the touch sensing device layer 113 are substantially not located on the same horizontal plane (not coplanar) due to the configuration of visual region A1 and the non-visual region A2, the planar layer 118 is disposed on the first surface 111a of the substrate 111. And the planar layer 118 covers the light shielding layer 112 and the metal trace layer 116 located in the non-visual region A2, and the touch sensing device layer 113 located in the visual region A1. The planar layer 118 can also be used for insulating the touch sensing device layer 113 from the metal trace layer 116.

Moreover, since moisture and/or solvent would exist in the light curable adhesive 130, the protective layer 114 is disposed on the planar layer 118 to avoid the metal trace layer 116 and the touch sensing device layer 113 being oxidized or scratched during the light curable adhesive 130 coating process, so that the protective layer 114 can protect the components and further improve the reliability of the touch panel 110. On the other hand, the buffer layer 119 is disposed on the first surface 111a of the substrate 111, wherein the light shielding layer 112 and the touch sensing device layer 113 are located on the buffer layer 119. More specifically, the buffer layer 119 is insulated between the insulating layer 117 of the visual region A1 and the substrate 111, and also insulated between the light shielding layer 112 of the non-visual region A2 and the substrate 111. Such configuration can prevent each of the component layers located on the buffer layer 119 from being damaged due to the diffusion of ions in the substrate 111 during the follow-up high temperature fabricating process. Herein the protective layer 114, the insulating layer 117, the planar layer 118 and the buffer layer 119 of the embodiment can be made by materials having properties of insulation and buffering.

Figure 3:
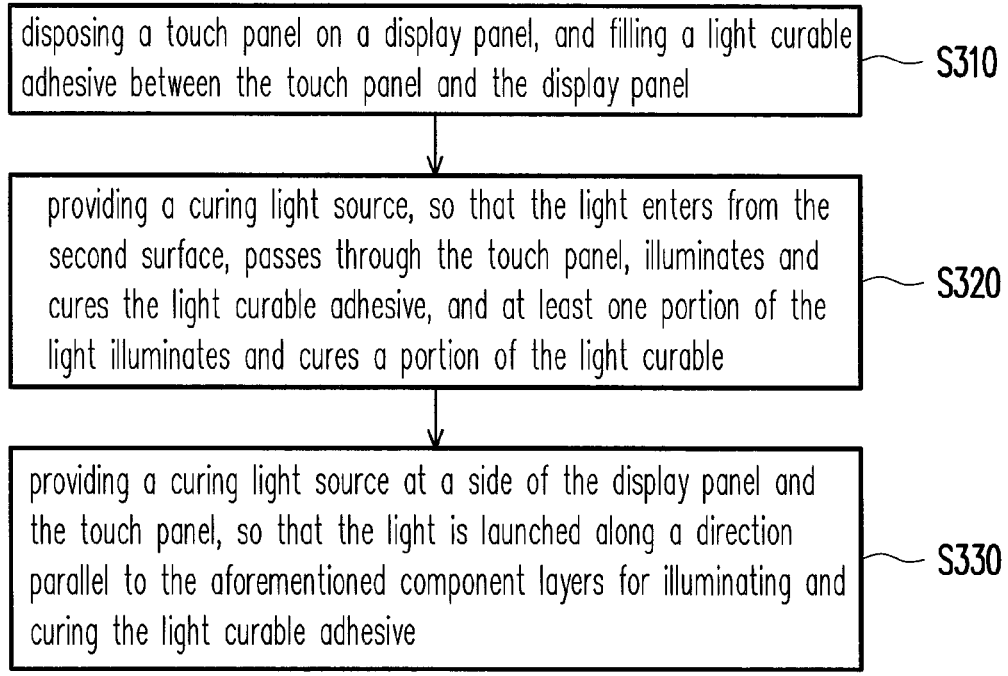
FIG. 3 is a flow chart related to an assembling method of the touch display device of FIG. 2.

FIG. 3 is a flow chart related to an assembling method of the touch display device of FIG. 2. Referring to FIG. 2 and FIG. 3 together, in the embodiment, first, in step S310, the touch panel 110 is disposed on the display panel 120, and a light curable adhesive 130 is filled between the touch panel 110 and the display panel 120. Then, in step S320, a curing light source 200 is provided, wherein the light of the light source 200 passes through the touch panel 110 from the second surface 111b, illuminates and cures the light curable adhesive 130, and a portion of the light (the light L1) illuminates and cures a portion of the light curable adhesive 130 located in the non-visual region A2 after the light L1 is refracted by the light transmission protrusion 115. Furthermore, in order to improve and ensure the curing effect of the light curable adhesive 130, in step S330, a curing light source 300 is provided to a side of the display panel 120 and the touch panel 110, so that the light can be launched along the direction parallel to the aforementioned component layers for illuminating and curing the light curable adhesive 130.

Figure 4:
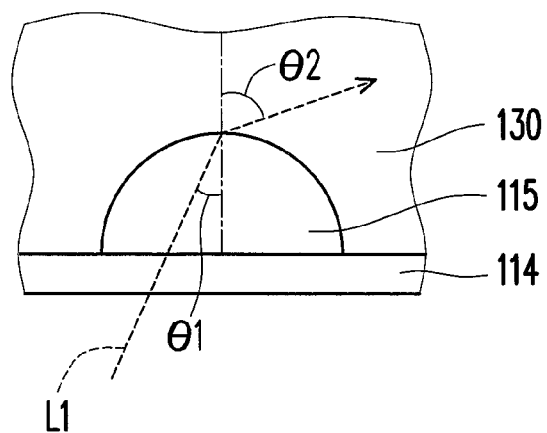
FIG. 4 is a partially enlarged view of the touch display device of FIG. 2.

FIG. 4 is a partially enlarged view of the touch display device of FIG. 2. Referring to FIG. 2 and FIG. 4 together, in the embodiment, in order that the light transmission protrusion 115 can receive at least a portion of the light L1 launched from the second surface 111b of the substrate 111 by the curing light source 200, the light transmission protrusion 115 is disposed along the edge of the light shielding layer 112 (i.e., the boundary between the visual region A1 and the non-visual region A2). Additionally, the cross-section of the light transmission protrusion 115 is a shape with an arc edge and the refractive index of the light curable adhesive 130 is smaller than the refractive index of the light transmission protrusion 115. And the preferable refractive index of the light transmission protrusion 115 is 1.6.

For instance, according to Snell's law, $n_1 \times \sin\theta_1 = n_2 \times \sin\theta_2$, wherein $\theta_1$ is the incident angle of the light L1 launched into the light curing adhesive 130, $\theta_2$ is the refractive angle of the light L1 launched out of the light transmission protrusion 115, $n_1 = 1.6$ and $n_1$ is the refractive index of the light transmission protrusion 115, $n_2 = 1.4$ and $n_2$ is the refractive index of the light curable adhesive 130. In order to avoid the light L1 generating total reflection in the light transmission protrusion 115, $\sin\theta_1 \leq (n_2/n_1)$, i.e., $(n_2/n_1) \times \sin\theta_2 \leq (n_2/n_1)$ is necessary, and thus $\theta_1 \leq 61.04°$ is further calculated. Accordingly, the designer can dispose the light transmission protrusion 115 onto a position of the protective layer 114 according to the calculation result, so that the incident angle $\theta_1$ of the light L1 launched into the light curable adhesive 130 from the light transmission protrusion 115 can be fit with the aforementioned result. Thus, the portion of the light curable adhesive 130 shielded by the light shielding layer 112 can be completely cured due to the refraction of the light L1.

In the embodiment, the light transmission protrusion 115 can be fabricated by a photoresist coating process, an exposure process and a developing process, but the fabricating method and the shape of the light transmission protrusion 115 are not limited in the present invention. In one embodiment of the present invention, the light transmission protrusion 115 can be an annular shape. In another embodiment of the present invention not shown in the figures, an optical film can also be disposed on the protective layer and a plurality of light transmission protrusions can be formed on the optical film. Furthermore, the cross-section of the light transmission protrusion can also be a polygonal shape and the effect similar to the aforementioned embodiment may also be achieved.

In light of the foregoing, in the embodiment of the present invention, a light can enter the light transmission protrusion and then is refracted to the light curable adhesive located in the non-visual region through the light transmission protrusion disposed on the protective layer of the touch panel. Thus, a portion of the light curable adhesive located in the non-visual region can be completely cured. Accordingly, through such configuration the touch display device can achieve a superior yield in the assembling process.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch panel for a touch display device, the touch panel comprising:
 a substrate having a first surface and a second surface opposite to the first surface, the first surface including a visual region and a non-visual region;
 a light shielding layer disposed in the non-visual region of the substrate;
 a touch sensing device layer disposed on the first surface of the substrate;
 a protective layer disposed on the first surface of the substrate and covering the light shielding layer and the touch sensing device layer; and
 at least one light transmission protrusion disposed on the protective layer, wherein at least a part of the at least one light transmission protrusion is located in the non-visual region, a light curable adhesive forming on the first surface of the substrate is used in bonding the touch panel to a display panel, the at least one light transmission protrusion is located between the light curable adhesive and the substrate, and the at least one light transmission protrusion refracts a light entering from the second surface towards the light curable adhesive in the non-visual region, wherein a refractive index of the light curable adhesive is smaller than a refractive index of the at least one light transmission protrusion.

2. The touch panel as claimed in claim 1, wherein a cross-section of the at least one light transmission protrusion is a shape with an arc edge or a polygonal shape.

3. The touch panel as claimed in claim 1, wherein the refractive index of the at least one light transmission protrusion is 1.6.

4. The touch panel as claimed in claim 1, wherein a remaining part of the at least one light transmission protrusion is located in the visual region.

5. A touch display device, comprising:
   a display panel;
   a touch panel oppositely disposed with the display device; and
   a light curable adhesive disposed between the touch panel and the display panel, wherein the touch panel comprises:
   a substrate having a first surface and a second surface opposite to the first surface, the first surface including a visual region and a non-visual region;
   a light shielding layer disposed in the non-visual region of the substrate;
   a touch sensing device layer disposed on the first surface of the substrate;
   a protective layer disposed on the first surface of the substrate and covering the light shielding layer and the touch sensing device layer; and
   at least one light transmission protrusion disposed on the protective layer, wherein at least a part of the at least one light transmission protrusion is located in the non-visual region, and a light enters the at least one light transmission protrusion from the second surface, wherein a portion of the light launches into and cures a portion of the light curable adhesive located in the non-visual region after being refracted by the light transmission protrusion.

6. The touch display device as claimed in claim 5, wherein a cross-section of the at least one light transmission protrusion is a shape with an arc edge or a polygonal shape.

7. The touch display device as claimed in claim 5, wherein a refractive index of the light curable adhesive is smaller than a refractive index of the at least one light transmission protrusion.

8. The touch display device as claimed in claim 7, wherein the refractive index of the at least one light transmission protrusion is 1.6.

9. The touch display device as claimed in claim 5, wherein a remaining part of the at least one light transmission protrusion is located in the visual region.

10. An assembling method of a touch display device, comprising:
    disposing a touch panel on a display panel, and filling a light curable adhesive between the touch panel and the display panel, wherein the touch panel comprises:
    a substrate having a first surface and a second surface opposite to the first surface, the first surface including a visual region and a non-visual region;
    a light shielding layer disposed in the non-visual region of the substrate;
    a touch sensing device layer disposed on the first surface of the substrate;
    a protective layer disposed on the first surface of the substrate and covering the light shielding layer and the touch sensing device layer;
    at least one light transmission protrusion disposed on the protective layer, wherein at least a part of the at least one light transmission protrusion is located in the non-visual region; and
    providing a light, wherein the light passes through the touch panel from the second surface and illuminates and cures the light curable adhesive, a portion of the light illuminates and cures a portion of the light curable adhesive located in the non-visual region after refracted by the at least one light transmission protrusion.

11. The assembling method of a touch display device as claimed in claim 10, wherein a refractive index of the light curable adhesive is smaller than a refractive index of the at least one light transmission protrusion.

12. The assembling method of a touch display device as claimed in claim 10, wherein the at least one light transmission protrusion is fabricated by a photoresist coating process, an exposure process and a developing process.

13. The assembling method of a touch display device as claimed in claim 10, wherein the at least one light transmission protrusion is formed on an optical film and disposed on the protective layer.

14. The assembling method of a touch display device as claimed in claim 10, further comprising providing another light from a side of the touch panel and the display panel for illuminating and curing the light curable adhesive.

* * * * *